United States Patent [19]

Bourquin et al.

[11] 3,853,915

[45] Dec. 10, 1974

[54] 9-OR 10-HALO-4H-BENZO[4,5]CYCLO-HEPTA[1,2-B]THIOPHEN-4-ONES

[75] Inventors: Jean-Pierre Bourquin, Magden/Aargaw; Gustav Schwarb, Allschwil; Erwin Waldvogel, Aesch, all of Switzerland

[73] Assignee: Sandoz Ltd., Basle, Switzerland

[22] Filed: Aug. 8, 1972

[21] Appl. No.: 278,738

Related U.S. Application Data

[63] Continuation-in-part of Ser. No. 278,244, Aug. 7, 1972, Pat. No. 3,749,786, which is a continuation-in-part of Ser. No. 120,738, March 3, 1971, Pat. No. 3,682,930, and a continuation-in-part of Ser. No. 178,449, Sept. 7, 1971, Pat. No. 3,770,728.

[30] Foreign Application Priority Data

Mar. 11, 1970 Switzerland............................ 3598/70
July 31, 1970 Switzerland.......................... 11593/70
Sept. 24, 1970 Switzerland.......................... 14120/70
Feb. 4, 1971 Switzerland........................... 1632/71

[52] U.S. Cl. ...... 260/332.3 P, 424/267, 260/293.57, 260/268 TR, 260/247.1
[51] Int. Cl. ............................................ C07d 63/18
[58] Field of Search ............ 260/332.3 P, 570.8 TC, 260/240 R

[56] References Cited
UNITED STATES PATENTS 3,491,103  1/1970  Jucker et al. .................... 260/293.4
3,574,199  4/1971  Coyne et al. .................. 260/240 TC
3,632,857  1/1972  Kyburz et al. .............. 260/570.8 TC
3,709,947  1/1973  Cusic et al............. 260/570.8 TC X
3,749,786  7/1973  Bourquin et al.................... 424/267

FOREIGN PATENTS OR APPLICATIONS 246,130  4/1966  Austria ........................... 260/332.3

*Primary Examiner*—John D. Randolph
*Attorney, Agent, or Firm*—Gerald D. Sharkin; Richard E. Vila

[57] ABSTRACT

The present invention concerns novel compounds of the formula,

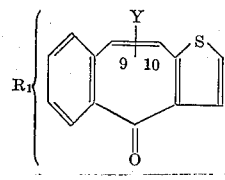

wherein
  $R_1$ is hydrogen, halogen, or alkoxy of 1 to 4 carbon atoms, and
  Y is chlorine or bromine in the 9 or 10 position.

The compounds are intermediates for the production of pharmacologically active compounds, particularly for compounds which are histaminolytics.

8 Claims, No Drawings

9-OR 10-HALO-4H-BENZO[4,5]CYCLO-HEPTA[1,2-B]THIOPHEN-4-ONES

This application is a continuation-in-part of copending application Ser. No. 278,244, filed Aug. 7, 1972, now U.S. Letters Pat. No. 3,749,786 which in turn is a continuation-in-part of application Ser. No. 120,738, filed Mar. 3, 1971 and now U.S. Letters Pat. No. 3,682,930, this application also being a continuation-in-part of copending application Ser. No. 178,449, filed Sept. 7, 1971, now U.S. Letters Pat. No. 3,770,728.

The invention relates to benzocycloheptathiophene ketones.

In accordance with the invention, there are provided new compounds of formula VII,

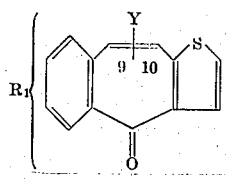

VII wherein
$R_1$ is hydrogen, halogen, or alkoxy of 1 to 4 carbon atoms, and
Y is chlorine or bromine in the 9 or 10 position.

The compounds of formula VII may, for example, be produced by chlorinating or brominating a compound of formula IX,

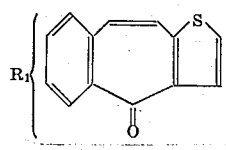

IX wherein $R_1$ is as defined above,
to obtain the corresponding 9,10-dichloro- or 9,10-dibromo compounds, and subsequently converting the resulting compounds into compounds of formula VII under alkaline conditions, e.g. by reaction with a solution of potassium hydroxide in an inert organic solvent such as methanol, or, e.g., by heating with a commercial solution or sodium or potassium hydroxide in the presence of a lower alcohol solvent.

The above 9,10-dibromo compounds obtained from the compounds of formula IX may, for example, likewise be obtained by reacting a compound of formula X,

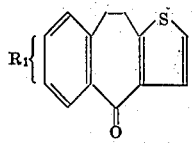

X wherein $R_1$ is as defined above,
with the stoichiometric amount of N-bromosuccinimide in an inert organic solvent, e.g. a chlorinated aliphatic hydrocarbon such as carbon tetrachloride.

The compounds of formula VII are useful intermediates for the production of pharmaceuticals, for example, compounds of formula I,

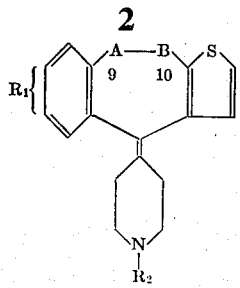

I in which
$R_1$ is as defined above,
$R_2$ is alkyl of 1 to 4 carbon atoms, and
—A—B— is the group —$CH_2$—CO— or —CO—$CH_2$—.

The compounds of formula I may be prepared from compounds of formula VII by the following sequence of reactions.

A compound of formula I is obtained by a process comprising
a. hydrolyzing a compound of formula II,

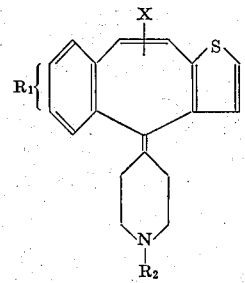

II wherein
$R_1$ and $R_2$ are as defined above, and
X is in the 9 or 10 position and is an —OR radical, wherein R is alkyl of 1 to 4 carbon atoms, a radical of formula III,

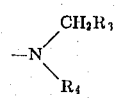

III wherein
$R_3$ is hydrogen or alkyl of 1 to 4 carbon atoms, and
$R_4$ is hydrogen or alkyl of 1 to 4 carbon atoms which is unbranched on the α carbon atom, or
$R_3$ and $R_4$, together with the nitrogen atom, form a saturated 5- or 6-membered heterocyclic ring, the heterocycle being selected from the group of heterocycles containing 1 or 2 nitrogen atoms, 1 nitrogen atom and a further hetero atom selected from oxygen and sulphur, and 1 nitrogen atom and one nitrogen atom substituted by an alkyl radical of 1 to 4 carbon atoms, or b. alkylating a compound of formula IV,

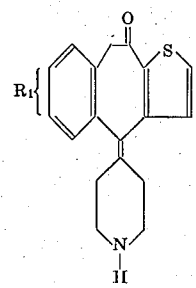

IV wherein $R_1$ is as defined above, to obtain a compound of formula Ia,

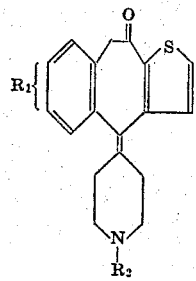

Ia wherein $R_1$ and $R_2$ are as defined above.

The resulting compound of formula I may be isolated in the form of a free base or as an acid addition salt thereof.

Particularly suitable $R_1$ radicals are hydrogen, chlorine, bromine and methoxy.

The symbol X in formula II is suitably the tert.butoxy group, the dimethylamino, diethylamino or n-butylamino radical, and when X denotes a heterocycle, it may be, e.g., the piperidine, piperazino, morpholino, pyrrolidino or N-methyl-piperazino radical.

The term "inert solvent" as used herein signifies an organic solvent which is inert under the reaction conditions.

The production of compounds of formula I in accordance with process variant (a) may, for example, be effected by heating compounds of formula II in an aqueous acid solution. The reaction temperature is not critical. A suitable reaction temperature is approximately 50° to 100°C; the reaction is preferably effected at the reflux temperature of the reaction mixture.

Suitable acids are aqueous inorganic acids, e.g. hydrochloric, sulphuric or phosphoric acid, and aqueous organic acids, e.g. formic, acetic, fumaric or oxalic acid.

The hydrolysis may also be carried out by hydrolyzing a mixture of compounds of formula II substituted in the 9 position with corresponding compounds of formula II substituted in the 10 position. Such hydrolysis results in a mixture of isomers of Ia and Ib,

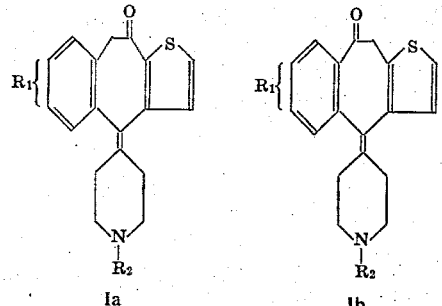

Ia            Ib wherein $R_1$ and $R_2$ are as defined above,
and said isomers may be separated in conventional manner, for example by fractional crystallization of a salt, e.g. a fumarate, to give the desired isomer.

Alkylation of the compounds of formula IV (in accordance with process variant b) may be effected in accordance with known methods, e.g. by treatment with alkyl halides, with esters of organic sulphonic acids, e.g. methane-, benzene- or p-toluene-sulphonic acid, or with dialkyl sulphates, in an inert solvent and in the presence of a basic condensation agent.

The compounds of formula I may be isolated from the worked up reaction mixture in conventional manner, e.g. chromatographically.

The compounds of formula II are likewise new.

Compounds of formula IIa,

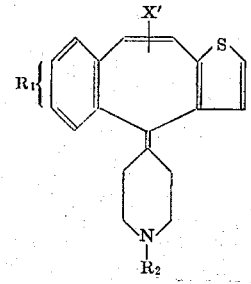

IIa wherein
$R_1$ and $R_2$ are as defined above, and
X' is in the 9 or 10 position and is a radical of formula III, may, for example, be obtained by reacting a compound of formula V,

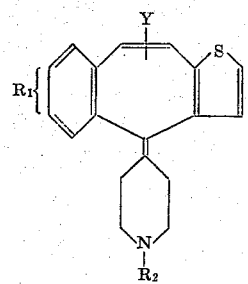

V wherein
$R_1$ and $R_2$ are as defined above, and
Y is chlorine or bromine in the 9 or 10 position, or a mixture of a compound of formula V substituted in the 9 position, with a compound of formula V substituted in the 10 position, in the presence of an acid-binding agent, e.g. an alkali metal amide or hydride or a potassium alcoholate, e.g. a potassium tert.butylate, with the corresponding amine or saturated, nitrogen-containing heterocycle.

This reaction yields a mixture of compounds of formula IIa substituted in the 9 position, with compounds of formula IIa substituted in the 10 position. A separation may be effected in accordance with known methods, but is not necessary; the worked up mixture is generally further worked up as such.

Compounds of formula IIb,

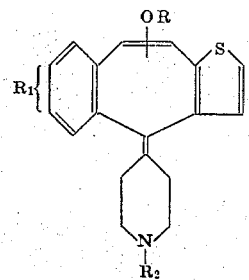

IIb wherein R, $R_1$ and $R_2$ are as defined above,
may be produced by reacting compounds of formula V with a potassium alcoholate, preferably an excess of the same, if desired in an inert organic solvent, e.g. a cyclic or open chain ether such as dioxane. The reaction is preferably effected at room temperature or at a slightly elevated temperature.

This reaction likewise yields a mixture of the compounds of formula IIb substituted in the 9 position, with the compounds of formula IIb substituted in the 10 position, which mixture is generally not separated, but further worked up after working up the reaction mixture.

The compounds of formula IV may, for example, be obtained by dealkylation of compounds of formula Ia in accordance with known methods. For example, compounds of formula Ia are treated with a cyanogen halide, preferably cyanogen bromide, or a halogen formic acid ester. In this reaction the radical $R_2$ is first replaced by the cyano or alkoxycarbonyl group. The reaction is conveniently effected in an inert organic solvent, e.g. an open chain or cyclic ether such as diethyl ether or tetrahydrofuran, an aromatic hydrocarbon such as benzene, a chlorinated aliphatic hydrocarbon such as methylene chloride, and at a reaction temperature between room temperature and the boiling temperature of the reaction mixture. The cyano or alkoxycarbonyl group is subsequently split off in accordance with known methods, e.g. by acid hydrolysis.

The compounds of formula V, which are likewise new, may be obtained by dehydrating a compound of formula VI,

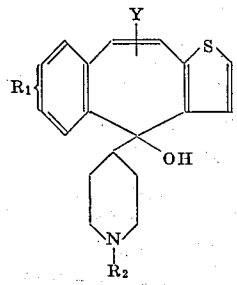

VI wherein $R_1$, $R_2$ and Y are as defined above.

The removal of water may, for example, effected with a mineral acid such as hydrochloric acid in ethanol, or with a strong organic acid, acetic anhydride or an inorganic acid halide as water-removing agent. However, the reaction is preferably effected with hydrobromic acid in an inert organic solvent, e.g. a lower alcohol.

Compounds of formula VI may, for example, be produced by adding dropwise a solution of a compound of formula VII,

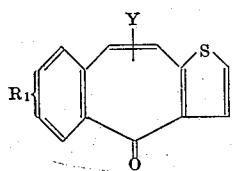

VII wherein $R_1$ and Y are as defined above,
in an inert organic solvent, e.g. an open chain or cyclic ether such as tetrahydrofuran or diethyl ether, to a magnesium organic halogen compound of formula VIII,

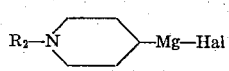

VIII wherein $R_2$ is as defined above, and
Hal signifies chlorine, bromine or iodine, in the same inert solvent in which it was prepared, conveniently stirring the reaction mixture for about 1 ½ hours, preferably at room temperature, and subsequently hydrolyzing. Hydrolysis may, for example, be effected with an aqueous ammonium chlorine solution in the cold.

The compounds of formula VII may also be used for the production of intermediates useful in a particularly efficient process for the production of compounds of formula Ia described above. The compound of formula VII is reacted with an organic magnesium compound of formula XI,

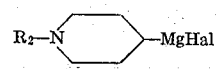

XI in which
Hal is chlorine, bromine or iodine, and
$R_2$ is as defined above,
and the reaction product is hydrolyzed to yield a compound of formula XII,

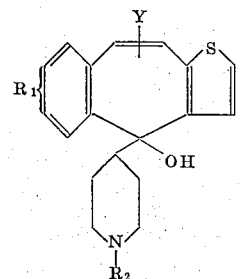

XII in which $R_1$, $R_2$ and Y are as defined above.

The compound of formula XII may be converted into into compounds of formula XIII,

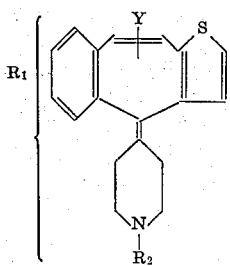

XIII in which $R_1$, $R_2$ and Y are as defined above,
by dehydration.

Examples of water-removing agents which may be used for the dehydration are: mineral acids such as sulphuric acid, ethanolic hydrochloric acid or hydrobromic acid, strong organic acids, such as acetic anhydride, or inorganic acid halides.

The compounds of formula XIII may be converted into compounds of formula Ia by treatment with a strong, aqueous non-oxidising acid. Suitable strong acids for the reaction are inorganic acids, e.g. sulphuric, hydrochloric, hydrobromic and phosphoric acids, and strong organic acids, e.g. aliphatic and aromatic sulphonic acids, e.g. methanesulphonic and toluenesulphonic acids and trifluoroacetic and trichloroacetic acids.

Certain acids, notably nitric acid, cause oxidation of the compounds, resulting in carbonisation or charring of the reaction mixture and the degradation of the starting compounds, and accordingly should not be used.

The preferred strong acids are those which dissociate completely or substantially completely to give a pH in 1N aqueous solution of from 0 to 1. With such acids, good yields can be obtained by, for example, heating a compound of formula XIII in solution in a 20 to 70 percent aqueous strong acid, to about 80° to 120°C.

The reaction period may range between 1 and about 15 hours, depending on the type and concentration of the acid used, and the reaction temperature.

When an extremely dilute acid or a slightly weaker acid, such as one which gives a reaction mixture having a pH of up to 3, is used, the reaction is conveniently effected at an elevated temperature, e.g. at about 200° to 230°C, and under pressure.

The compounds of formula II are fairly or readily soluble in aqueous acids. Therefore, the addition of a solution acid is generally not essential. When a solution aid, e.g. an alkanol, is used, then it is advisable to keep the percentage of this solution aid as low as possible.

When an appropriate water-removal agent, i.e. a strong, aqueous, non-oxidising acid, is used, the compounds of formula XII may be converted into the compounds of formula Ia without isolation of the compounds of formula XIII. In this direct process variant it is advisable to keep the percentage of any solution aid used as low as possible.

The compounds of formula VII may, for example, be produced by chlorinating or brominating a compound of formula IX,

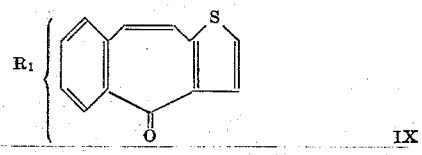

wherein $R_1$ is as defined above, to obtain the corresponding 9,10-dichloro- or 9,10-dibromo compounds, and subsequently converting the resulting compounds into compounds of formula VII under alkaline conditions, e.g. by reaction with a solution of potassium hydroxide in an inert organic solvent such as methanol, or, e.g., by heating with a commercial solution or sodium or potassium hydroxide in the presence of a lower alcohol solvent.

The above 9,10-dibromo compounds obtained from the compounds of formula IX may, for example likewise be obtained by reacting a compound of formula X,

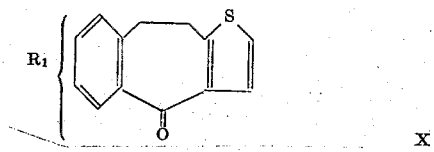

wherein $R_1$ is as defined above, with the stoichiometric amount of N-bromosuccinimide in an inert ogranic solvent, e.g. a chlorinated aliphatic hydrocarbon such as carbon tetrachloride.

Insofar as the production of the starting materials is not described, the compounds are known or may be produced in accordance with known processes or in a manner analogous to the processes described herein or to known processes.

The compounds of formula I and pharmaceutically acceptable acid addition salts thereof are useful because they possess pharmacological activity in anmials. More particularly, compounds of formula Ia are useful as specific histaminolytics, and the compounds of formula Ib, on the other hand, the useful antaminics, i.e. they are useful in antagonizing the effects of each of the biogenic amines histamine, serotonin and acetylcholine.

For use of a compound of formula Ia as a specific histaminolytic or a compound of formula Ib as an antaminic, the dose to be administered will naturally vary depending on the compound employed, the mode of administration and the treatment desired. However, the doses are similar for compounds of formula Ia and compounds of formula Ib, and satisfactory results for each group of compounds are obtained at doses between about 0.004 mg/kg and 0.15 mg/kg animal body weight. For the larger mammals, the daily dose is from about 0.25 to about 10 milligrams of the compound, which may be administered in divided doses 2 to 3 times a day or in sustained release form. Unit dosage forms suitable for oral administration incorporate from about 0.1 to about 5 milligrams of the compound, in association with a pharmaceutical carrier or diluent.

In the following non-limitative Examples all temperatures are indicated in degrees Centigrade.

EXAMPLE 1

9(10)-Bromo-4H-benzo[4,5]cyclohepta[1,2-b]thiophen-4-one

A mixture of 70 g of 9,10-dibromo-9,10-dihydro-4H-benzo[4,5]cyclohepta[1,2-b]thiophen-4-one, 31.6 g of potassium hydroxide and 3,200 cc of methanol is heated under reflux while stirring for 2 hours. The mixture is subsequently stirred at 0°–5° for approximately 4 hours, and the crystalline product is filtered off. After recrystallizing from a 100-fold quantity of methanol, pure 9,10-bromo-4H-benzo[4,5]cyclohepta[1,2-b]thiophen-4-one, having a M.P. of 134°–135°, is obtained. Microanalysis agrees with the formula $C_{13}H_7BrOS$. In accordance with the nuclear magnetic resonance spectrum the bromine atom is in the 9 or 10 position (probably in the 10 position).

The starting material was obtained as follows:

A mixture of 129 g of 9,10-dihydro-4H-benzo[4,5]-cyclohepta[1,2-b]thiophen-4-one, 214 g of N-bromosuccinimide, 1.2 g of benzoly peroxide and 2,000 cc of absolute carbon tetrachloride is boiled under reflux while stirring for 3 hours. The mixture is subsequently filtered whilst hot and the filtrate is concentrated to one third of its original volume. After allowing to stand at room temperature for several hours, the crystalline product is filtered off and dried. This crude product is recrystallized from a 7-fold quantity of chloroform. Pure 9,10-dibromo-9,10-dihydro-4H-benzo[4,5]cyclohepta[1,2-b]thiophen-4-one, having a M.P. of 134°–135° (decomp.), is obtained in this manner. Microanalysis agrees with the formula $C_{13}H_8Br_2OS$. The structure was ascertained with the nuclear magnetic resonance spectrum.

EXAMPLE 2

9(10)-Bromo-6-chloro-4H-benzo[4,5]cyclohepta[1,2-b]-thiophen-4-one

A mixture of 28.5 g of 6-chloro-9,10-dibromo-9,10-dihydro-4-H-benzo[4,5]cyclohepta[1,2-b]thiophen- 4-one, 320 cc of methanol and 11.8 g of potassium hydroxide is boiled at reflux for 1 hour. The reaction mixture is subsequently cooled, 320 cc of water are added, and the crystals are filtered off. The crystalline product is washed with a large quantity of water and dried in a vacuum at 60°. Recrystallization is subsequently effected from a 20-fold quantity of tetrahydrofuran. Pure 9(10)-bromo-6-chloro-4H-benzo-[4,5]cyclohepta[1,2-b]thiophen-4-one, having a M.P. of 198°–200°, is obtained in this manner. Microanalysis agrees with the formula $C_{13}H_6BrClOS$. The structure was ascertained with the nuclear magnetic resonance and mass spectrograph spectra.

The starting material was obtained as follows:

A mixture of 26 g of 6-chloro-9,10-dihyro-4H-benzo-[4,5]cycloheptal[1,2-b]thiophen-4-one, 260 cc of absolute carbon tetrachloride, 39 g of N-bromosuccinimide and 0.5 g of dibenzoly peroxide is heated at reflux for 4½ hours. The suspension is subsequently cooled and allowed to crystallize over night at 0°–5°. The crystalline product is filtered off and suspended in 65 cc of absolute ethanol. The crystalline product is subsequently filtered off and washed with a large quantity of water. After drying at 60° in a vacuum, recrystallization is effected from a 20-fold quantity of chloroform/petroleum ether (1:1). Pure 6-chloro-9,10-dibromo-9,10-dihydro-4H-benzo[4,5]cyclohepta[1,2-b]thiophen-4-one, having a decomposition point of 147°–149°, is obtained in this manner. Microanalysis agrees with the formula $C_{13}H_7Br_2ClOS$.

EXAMPLE 3

9(10)-Bromo-7-chloro-4H-benzo[4,5]cyclohepta[1,2-b]-thiophen-4-one

The title compound was obtained in analogous manner to that of Example 1, M.P. 218°–220°.

EXAMPLE 4

6,9(10)-Dibromo-4H-benzo[4,5]cyclohepta[1,2-b]thiophen-4-one

The title compound was obtained in analogous manner to that of Example 1, M.P. 177°–190°.

EXAMPLE 5

9(10)-Bromo-7-methoxy-4H-benzo[4,5]cyclohepta[1,2-b]-thiophen-4-one

The title compound was obtained in analogous manner to that of Example 1, M.P. 182°–184°.

EXAMPLE 6

9(10)-Bromo-6-chloro-4H-benzo[4,5]cyclohepta[1,2-b]-thiophen-4-one

The title compound was obtained in analogous manner to that of Example 1, M.P. 198°–200°.

EXAMPLE 7

9(10)-Chloro-4H-benzo[4,5]cyclohepta[1,2-b]thiophen-4-one

In analogous manner to Example 1, but using chlorine gas and using chclohexane as solvent, the title compound is obtained, M.P. 124°–126°.

What is claimed is:

1. A compound of the formula:

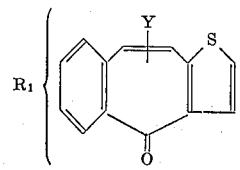

in which $R_1$ is hydrogen, halogen or alkoxy of 1 to 4 carbon atoms, and

Y is chlorine or bromine in the 9 or 10 position.

2. The compound of claim 1 which is 9(10)-bromo-4H-benzo[4,5]cyclohepta[1,2-b]thiophen-4-one.

3. The compound of claim 1 which is 9(10)-bromo-6-chloro-4H-benzo[4,5]cyclohepta[1,2-b]thiophen-4-one.

4. The compound of claim 1 which is 9(10)-bromo-7-chloro-4H-benzo[4,5]cyclohepta[12,-b]thiophen-4-one.

5. The compound of claim 1 which is 6,9(10)-dibromo-4H-benzo[4,5]cyclohepta[1,2-b]thiophen-4-one.

6. The compound of claim 1 which is 9(10)-bromo-7-methoxy-4H-benzo[4,5]cyclohepta[1,2-b]thiophen-4-one.

7. The compound of claim 1 which is 9(10)-bromo-6-chloro-4H-benzo[4,5]cyclohepta[1,2]thiophen-4-one.

8. The compound of claim 1 which is 9(10)-chloro-4H-benzo[4,5]cyclohepta[1,2]thiophen-4-one.

* * * * *